July 1, 1958

C. B. GREESON 2,840,971

DISC HARROW

Filed March 15, 1954

INVENTOR:
CLARETT B. GREESON
BY: Emerson B Donnell
ATTORNEY

July 1, 1958
C. B. GREESON
2,840,971
DISC HARROW
Filed March 15, 1954
3 Sheets-Sheet 2
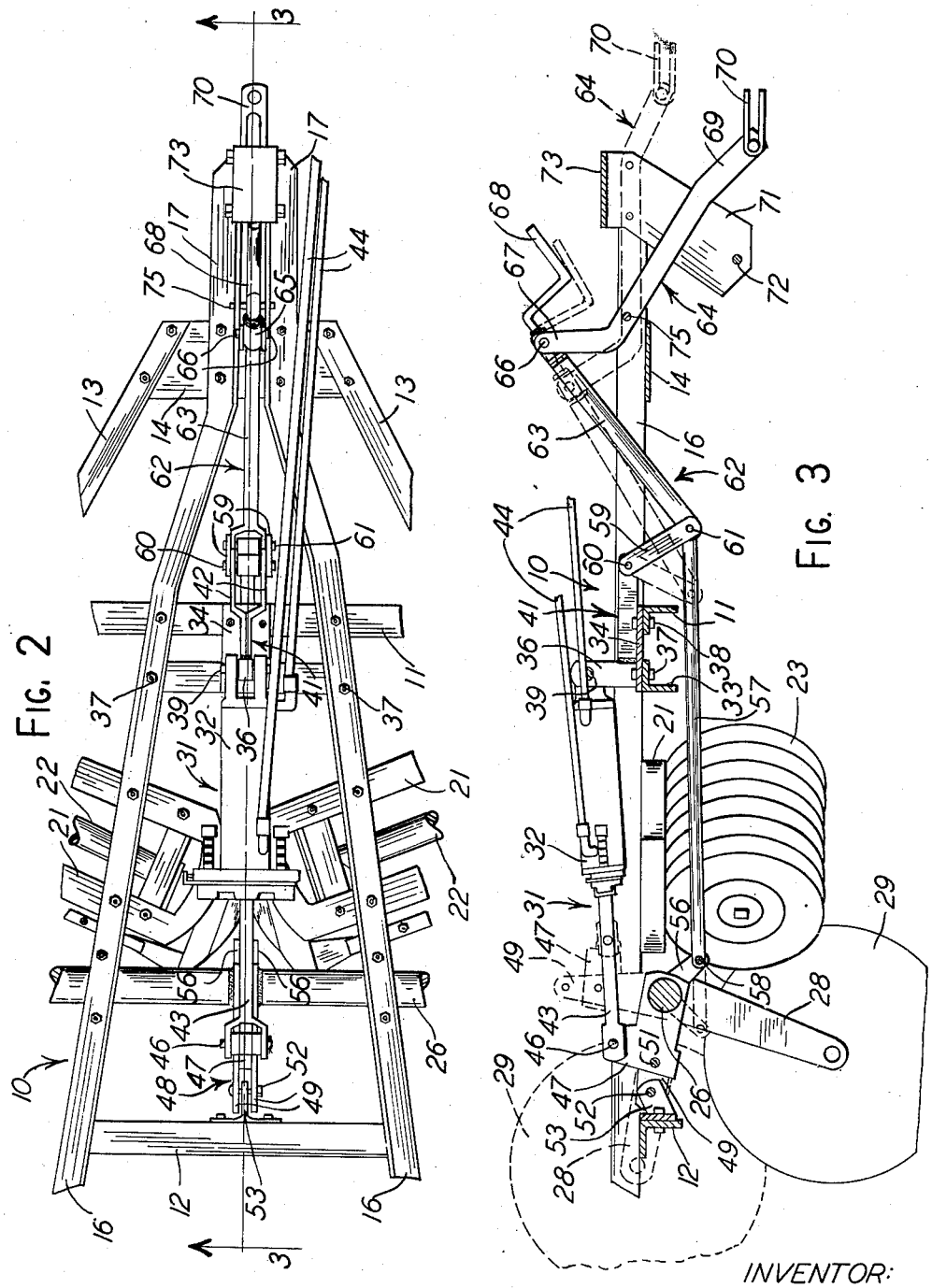
INVENTOR:
CLARETT B. GREESON
BY: Emerson B Donnell
ATTORNEY July 1, 1958  C. B. GREESON  2,840,971
DISC HARROW Filed March 15, 1954  3 Sheets-Sheet 3

INVENTOR:
CLARETT B. GREESON
BY *Emerson B. Donnell*
ATTORNEY

United States Patent Office 2,840,971
Patented July 1, 1958

2,840,971
DISC HARROW

Clarett B. Greeson, Rockford, Ill., assignor to J. I. Case Company, Racine, Wis., a corporation of Wisconsin Application March 15, 1954, Serial No. 416,237

2 Claims. (Cl. 55—73)

This invention relates to a tandem disc harrow, and, specifically, it relates to a wheel type disc harrow automatic leveling mechanism.

It is a well known principle of the tandem disc harrow construction to employ means which will maintain the disc gangs on a common horizontal level. The means maintain the gangs horizontal while the disc harrow is transported, by a tractor or the like, as well as during the operation of the harrow. The common means employed include a set of pneumatic tires mounted on the harrow frame to be vertically movable with respect to the frame and to thereby position the discs at a selected horizontal level. This arrangement permits the operator to control the depth of penetration of the discs into the ground. Also, to position and maintain the harrow horizontally level, the drawbar connecting the harrow to the tractor is actuated to correspond to the adjustment of the tires and thus provide the necessary two-point support upon which the harrow is leveled.

The art is developed to where disc harrows are leveled by power means such as a hydraulic piston cylinder system. Generally, this hydraulic system is directly connected to the axle supporting the harrow tires while a linkage extends from there to the drawbar at the front of the disc harrow. In this construction, the tires and the drawbar are actuated simultaneously a corresponding amount with the usually desired result of generally maintaining the disc harrow horizontally level.

However, these prior constructions do not provide for ready adjustment in the leveling process to actually tilt the harrow with respect to the horizontal. Thus, in certain harrow operations, it is desirable to shift the front of the harrow up or down with respect to the rear of the harrow. Also, an adjustment will compensate for different elevations in different tractor hitches, differences in relative tire hardness and wear between the tractor and the disc harrow, and other factors which place the tractor hitch in a different vertical position.

It is an object of this invention to provide a disc harrow leveling mechanism which will readily permit tilting and leveling of the harrow.

Another object of this invention is to provide a disc harrow leveling mechanism which can be precisely adjusted with a minimum of time and effort.

Still another object is to provide a disc harrow leveling mechanism which can be adjusted without detaching the harrow from the tractor.

Other objects and advantages will become apparent upon reading the following description in light of the accompanying drawings, in which, Fig. 1 is a side perspective view of a disc harrow containing a preferred embodiment of this invention.

Fig. 2 is a fragmentary top plan view of the center of the harrow shown in Fig. 1.

Fig. 3 is a sectional view taken on the line 3—3 of Fig. 2.

Similar reference numerals refer to the same or similar parts throughout the several views. Also, to simplify the disclosure, all of the dotted lines in the drawings represent another position of the operating parts which are shown in full lines.

Figure 1:
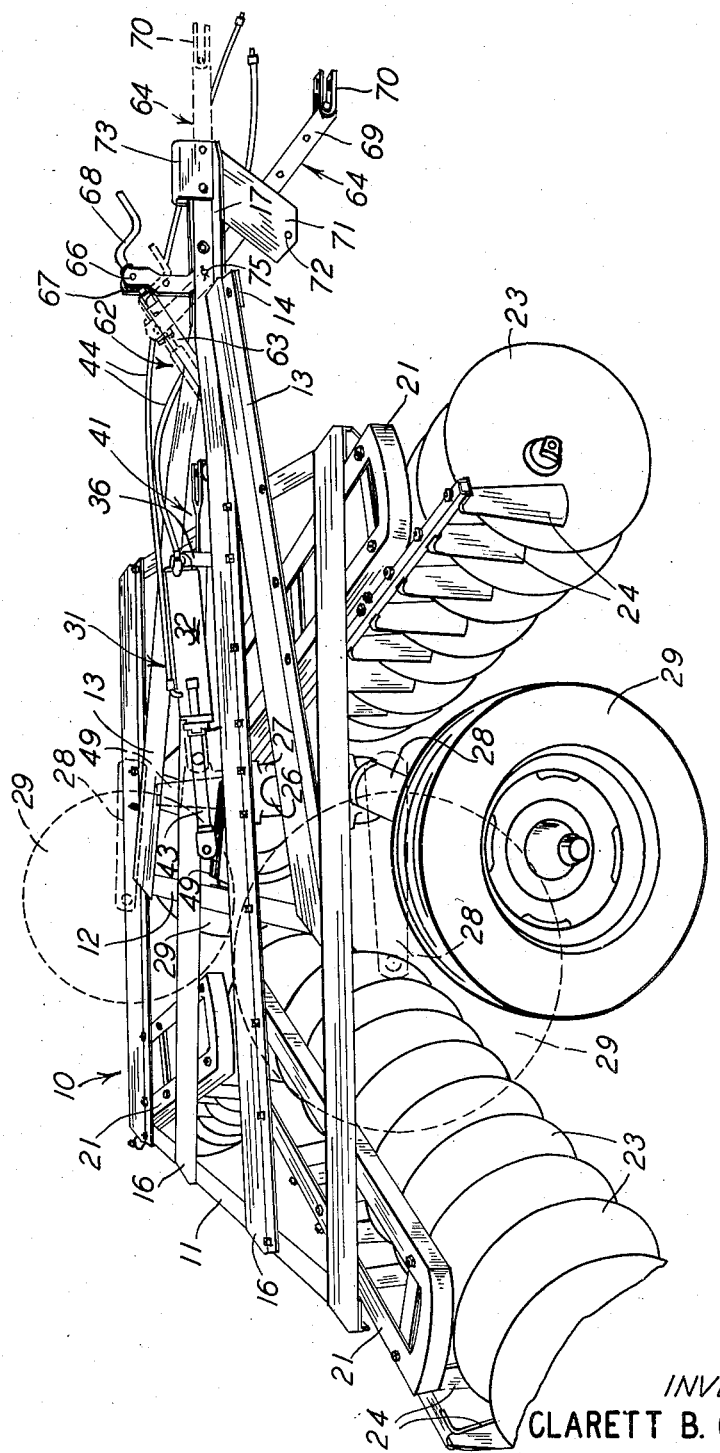

Referring to Figs. 1 and 2, the preferred embodiment shown therein is a perspective view of a disc harrow. The harrow is, of course, usually pulled by a tractor during the transportation and operation of the harrow. The disc harrow shown consists of a main frame 10 formed by a network of angle irons which are generally horizontally disposed when properly supported. The irons are formed into a square base frame 11 with an interconnecting angle iron 12 extending across the center of the square to the sides thereof. Also, a pair of obliquely positioned angle irons 13 forms a part of the frame 10 and each angle 13 is attached to extend from an opposite end of the angle 12, to attach to the front angle of the frame 11 to where a connecting plate 14 joins the converging ends of the angles 13 forming a drawbar portion. To complete the frame 10, a second pair of obliquely positioned angle irons 16 is attached to the rear and the front of the frame 11 and also connects with the angle 12 and converges at the front end of the harrow. Here the irons 16 are attached to the plate 14 and extend slightly beyond in parallel end 17.

Suitably attached to the frame 10 to depend therefrom are four disc harrow gang frames 21 which are oblique to the longitudinal center line of the frame 10. The frames 21 carry suitable supports for horizontally positioned axles 22 which in turn support a plurality of rotatable discs 23 spaced along the axles. Also, it is preferred to provide a plurality of disc scrapers 24 attached to the frame 21 and positioned in scraping relation to the face of each disc to remove any dirt that clings to the discs.

Also, transversely mounted below the frame 10 is an axle 26 which is rotatably supported in bearings 27 attached to the frame. Opposite ends of the axle 26 have offset portions or arms 28 attached thereto for the purpose of rotatably supporting a set of ground engaging supports or tires 29. It will be noted that the arms 28 are transverse to the axle 26 to offset the tires from the axle. Thus, approximately a ninety degree rotation of the axle positions the tires from their position in Fig. 1, as shown by the full lines, to the position indicated by the dotted lines. This action raises and lowers the frame 10 and correspondingly moves the discs 23 to enable selective positioning of the discs with respect to the ground. The wheels do not actually move up and down as shown in the drawing, but it is so shown for simplicity of drawing and, therefore, easier understanding of it. The wheels actually remain on the ground while the frame 10 moves down or up, as will be apparent.

The preferred mechanism employed for rotating the axle 26 is termed the actuating mechanism, generally designed 31, which is mounted at the front and center on the frame 10. The mechanism 31 consists of a hydraulic cylinder 32 which is suitably attached at its front end to the frame 10 by means of a short angle plate 33 and a second plate 34 which carry an upright post 36. The angle 33 is attached to the bottom of the angles 16 by bolts 37, or the like, and is positioned horizontally immediately behind the front piece of the frame 11. Then, plate 34 is attached between the plate 33 and the front of the frame 11 by the bolts 38.

The post 36 is preferably welded to the top of the plate 34 and contains a hole in the upper end for receiving a pin 39 which pivotally mounts the cylinder 32 on the frame 10. At this time it should also be noted that a bifurcated bar 41 is welded to the top of the plate 34 to extend longitudinally of the frame 10 with spaced arms 42 projecting beyond the front angle of the frame for a purpose described later.

The rear end of the cylinder 32 contains a piston rod 43 which is actuated axially into and out of the cylinder by hydraulic pressure acting on a piston inside the cylinder. To control the cylinder pressure, a pair of hoses 44 communicates with opposite ends of the cylinder and leads to a pressure source on the tractor. Since the cylinder system is a conventional structure, no further description of it is necessary.

Figure 5:
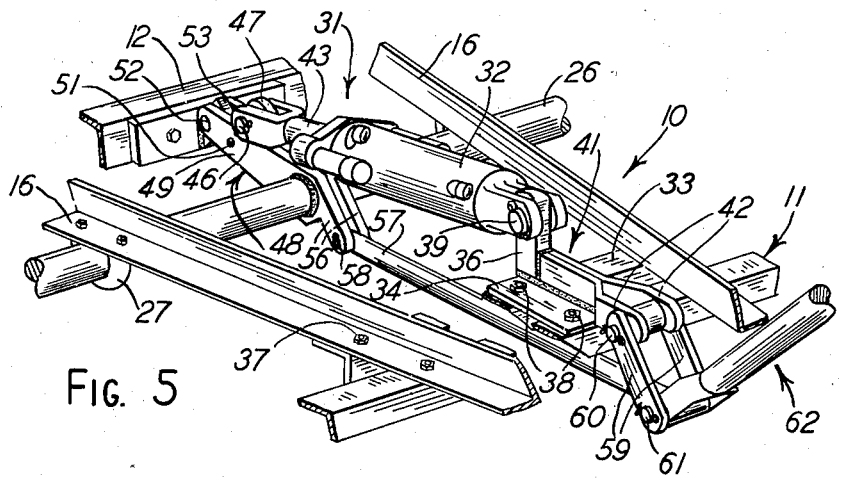
Fig. 5 is an enlarged fragmentary perspective view of a part of the embodiment shown in Fig. 1.

As shown best in Figs. 3 and 5, the end of the rod 43 is pivotally attached by a pin 46 to a plate 47 which is freely rotatably mounted on the center of the axle 26 to be transverse thereto. A pair of angle shaped plates 48 is preferably welded onto the axle 26 in a transverse direction, comprising an arm 49 on each side of the plate 47. The arms 49 and the plate 47 have aligned holes which receive a removable pin 51 to lock the plates together as a unit. With this arrangement, it should be obvious that actuation of the piston rod 43 will rotate the plates 47 and 49 and correspondingly the axle 26 to raise and lower the frame 10. When the tires are in the lowest position, the mechanism is as shown in Figs. 3 and 5. Then, if it is desired, the extending ends of the arms 49 can be attached to the angle iron 12 of the frame 10 by a removable pin 52 which connects with a post or bracket 53 attached to the angle 12. This connection of the plates 48 will then maintain the frame raised for transport and the hydraulic cylinder need not be connected for operation.

As will be apparent, with arms 49 fixed to post 53, and cylinder 32 relieved of fluid pressure, pin 51 may be removed, after which plate 47 may be freely pivoted about axle 26 to facilitate disconnecting or removing and replacing cylinder 32.

The plates 48 also include angularly projecting lower arms 56 which are rigid parts of the plates. Thus, any rotation of the arms 49 will swing the arms 56. It is preferred that the ends of the arms 56 be pivotally connected to a link 57 by a connecting pin 58. The link 57 then extends longitudinally and substantially horizontally under the frame 10 to the front thereof where it connects to a pair of short links 59. The links 59 are pivotally attached to the bar 41 by a pin 60 while a pin 61, at the opposite ends of the links 59, provides for a pivotal attachment of the link 57 with the links 59.

Figure 4:
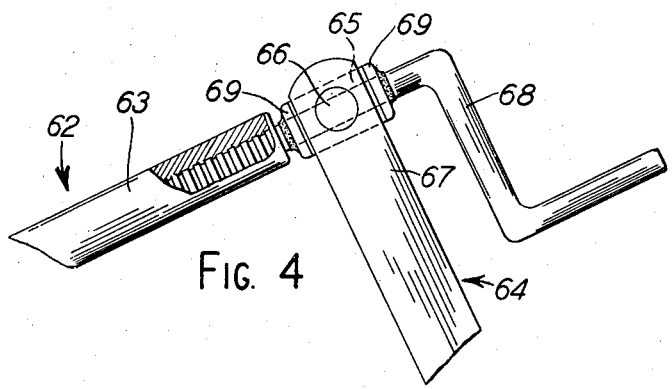
Fig. 4 is an enlarged fragmentary view of a part of the embodiment shown in Fig. 1.

Also pivotally attached to the pin is a link 62 which includes an elongated tube, sleeve or nut 63 which projects forwardly and upwardly between the frame angle irons 16 to where the link pivotally attaches to a drawbar or tongue portion 64. The preferred attachment includes the provision of a sleeve 65 with a pair of trunnions 66 integrally attached to pivotally join with a bifurcated end 67 of the drawbar 64. An adjusting crank member 68 is threadedly engaged with an end of the tube 63 and projects through the sleeve 65. To secure the crank against axial movement in the sleeve, a pair of collars 69 is positioned at opposite ends of the sleeve and each collar is preferably welded to the crank. See Fig. 4. In this construction, the crank 68 is free to rotate within the sleeve 65 to thread into or out of the tube 63 and thereby change the length of the link 62.

The parallel front ends 17 of the angle 16 provide a transverse pin 75 which pivotally mounts the tongue or drawbar 64. The front end 69 of the drawbar is preferably arranged with a clevis 70 to attach to a tractor hitch (not shown). Also attached to the parallel ends 17 is a pair of guide plates 71 which are spaced apart to permit up and down movement of the drawbar and are provided with a lower stop 72 which limits the downward movement. A hood 73 is provided across the top of the guides to secure the structure and provide a stop which limits the upward movement of the drawbar.

In view of the foregoing, it should be understood that the mechanism operates to raise and lower the frame 10 by the action of the hydraulic system in rotating the axle 26. Since the arms 56 are rigidly attached to the axle, they also rotate to actuate the link 57 which in turn actuates the link 62. The series of link movements position the drawbar or tongue leading end 69 and the clevis 70 in a predetermined position in a vertical plane. The front end of the frame 10 is thereby raised and lowered an amount equal to the movement of the frame 10 at the location of the axle. Between the dotted and solid lines, Fig. 3 shows the movement of the parts during the action mentioned. It should be understood that the tires and the clevis shown by the dotted lines do not actually move to those positions; instead the other parts of the disc harrow move with respect to them. The drawings show the relative movement between the stationary and moving parts.

Figure 6:
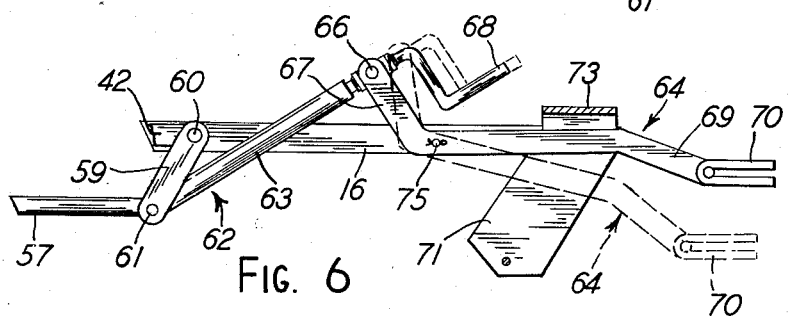
Fig. 6 is an enlarged fragmentary side view of a part of the embodiment shown in Fig. 1.

The link 62 and the drawbar 64 are adjustably connected by the screw threads mentioned to permit further vertical adjustment of the front end of the frame 10 with the position of the middle of the frame. To achieve this, the crank or screw 68 is rotated in the tube 63 to lengthen or shorten the link 62 and thus further pivot the drawbar 64 to raise or lower the clevis 70. The frame 10 is thus adjustably tilted downward or upward, as desired, at the front end. The adjustment is shown in Fig. 6 by the dotted lines which indicate the change in the position of the drawbar. In the change shown, the crank has been threaded into the tube to shorten the link 62 and raise the drawbar 69, thus lowering the front of the frame 10 and correspondingly lowering the front gangs of discs with respect to the rear gangs of the discs.

While a specific embodiment of this invention has been disclosed, the scope of this invention should be limited only by the appended claims.

I claim:

1. In a wheel type harrow for use with a tractor the combination of a frame, an axle rockingly secured to the frame in a position transverse to the direction of progress and having offset portions, ground engaging supporting means on said offset portions whereby rocking of said axle will cause raising and lowering of said frame in relation to the ground, means for so rocking said axle, a drawbar structure substantially rigid with said frame and extending toward the tractor, a tongue portion pivoted for up-and-down swinging movement on said drawbar structure and having rigid therewith an upwardly directed actuating arm, means on said tongue portion for connection to a tractor, a plurality of harrow gangs carried on said frame for engagement with the ground when said frame is lowered, a generally downwardly extending actuating arm on the axle and, in one position of the parts, extending in a direction generally parallel to the arm on said tongue portion, link means connecting said arms for swinging of said tongue portion in response to rocking of said axle, and including a forwardly and upwardly inclined threaded member and a second threaded member engaged with the first and having a control extending to a point within reach of an operator on the tractor, for effecting a corrective adjustment of the position of said tongue portions in relation to that of said axle.

2. In a wheel type harrow for use with a tractor the combination of a frame, an axle rockingly secured to the frame in a position transverse to the direction of progress and having offset portions, ground engaging supporting means on said offset portions whereby rocking of said axle will cause raising and lowering of said frame in relation to the ground, power driven means for so rocking said axle, a drawbar structure substantially rigid with said frame and extending toward the tractor, a tongue portion pivoted for up-and-down swinging movement on said drawbar structure and having rigid therewith an upwardly directed actuating arm, means on said tongue for connection to a tractor, a plurality of harrow gangs carried on said frame for engagement with the ground when said frame is lowered, a generally downwardly extending actuating arm on the axle and, in one position of the parts, extending in a direction generally parallel to the arm on said tongue portion, link means connecting said arms for swinging of said tongue portion in response to rocking of said axle, and including a forwardly and upwardly inclined internally threaded sleeve and a threaded shaft engaged within said sleeve for effecting a corrective adjustment of the position of said tongue in relation to said axle, and having a manually actuable control extending to a point within reach of an operator on the tractor.

References Cited in the file of this patent

UNITED STATES PATENTS

| | | |
|---|---|---|
| 1,932,450 | Dyrr | Oct. 31, 1933 |
| 2,320,742 | Newkirk | June 1, 1943 |
| 2,469,622 | Acton | May 10, 1949 |
| 2,532,577 | Silver et al. | Dec. 5, 1950 |
| 2,672,084 | Forgy | Mar. 16, 1954 |
| 2,684,021 | Ratzlaff | July 20, 1954 |